3,154,405
REDUCTION OF IRON OXIDE
Theodore M. Engle, Lambertville, and Harold H. Stotler, Westfield, N.J., assignors to Hydrocarbon Research, Inc., New York, N.Y., a corporation of New Jersey
Filed Oct. 1, 1962, Ser. No. 227,265
4 Claims. (Cl. 75—26)

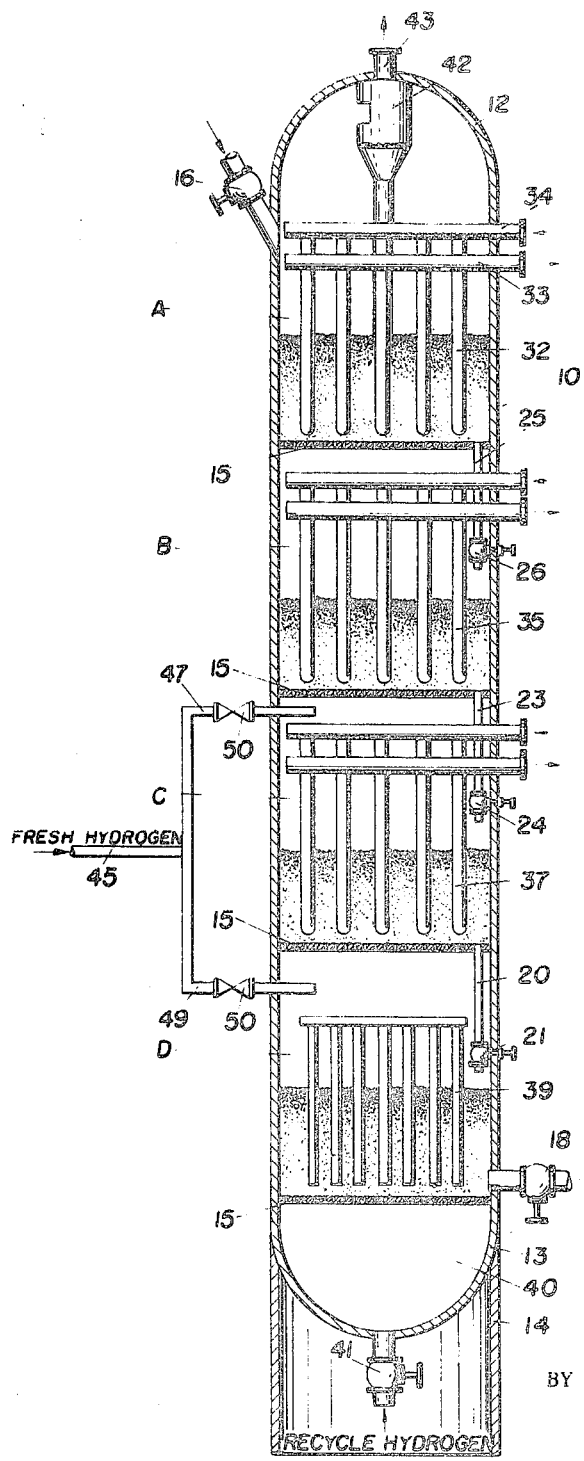

This invention relates to improvements in the reduction of iron oxide ore to produce substantially pure metal. It is an improvement on the process as described in the Keith et al. patent, No. 2,900,246, and the Keith patent, No. 2,995,426.

As described in these patents, it has been found entirely practical and considerably less costly to directly reduce iron oxide in a fluidized bed utilizing hydrogen as the reducing gas under pressures of at least 200 p.s.i.g. and temperatures in the range of 700° to 1000° F. High degrees of reduction are obtained by maintaining a series of fluidized beds through which the reducing gas passes. The effluent which contains a substantial amount of water vapor due to the reaction of hydrogen with the oxide of the iron is then cooled, the water removed, and the relatively pure hydrogen is then repressured, reheated and recycled to the system.

The available reducing gas, in the case of hydrogen is frequently produced by a partial oxidation or reforming process, and, after the water gas shift, usually contains about 2.0 to 3.0% of CO. When fresh make-up hydrogen is introduced along with recycle hydrogen to the bottom bed of the reducer, this CO must be removed for effective operation, by the copper liquor treatment, for the presence of small amounts of CO in the lower bed lowers the rate of reduction.

This will be apparent when it is considered that the iron in the lowermost bed is of relatively high purity (90% to 95% reduced) with the result that it acts as a high quality catalyst for the conversion of the CO with hydrogen to water and methane. A cubic foot of CO produces one cubic foot of water vapor and one cubic foot of methane. The water vapor produced by this reaction thus slows down the rate of reduction in the lower bed.

Pretreating steps, such as the ammonia liquor step for removal of CO, are expensive however and we have by our invention, sought to eliminate this expense. This can be accomplished, and we find it to be effective, by separately feeding fresh hydrogen, even if it contains as much as two or three percent CO to one of the reaction zones or ore beds above the bottom one and feeding only recycle hydrogen to the lower bed having the highly reduced iron.

The effect of the water vapor formed by the methanation of CO, on the rate of reduction of iron oxide is far less critical while the iron oxide is being reduced in the lower degree of reduction range. In accordance with our invention, we add the make-up fresh hydrogen to those beds in a multi-stage reducer where the ore is not being highly reduced. This permits the fresh hydrogen to contain higher percentages of carbon monoxide without having a very harmful effect on the rate of reduction of the iron oxide, and eliminates the need for a copper liquor treatment to remove carbon monoxide from the fresh hydrogen.

In accordance with our invention, we prefer to add the fresh hydrogen to an intermediate bed of the reducer for if a CO contaminant is fed to an upper bed at our low temperature of reduction, it goes overhead and accumulates in the system.

The object of our invention is to improve the direct reduction of metallic oxides in fluidized beds under low wherein higher yields of reduction and shorter reduction cycles are obtainable.

Further objects and advantages of our invention will appear from the following description of a preferred form of embodiment thereof when taken with the attached drawing illustrative thereof and in which the figure is a schematic elevation, with parts in section of a process reactor for reducing iron ore.

The reactor generally shown at 10 is preferably a cylindrical tower having a hemispherical top 12 and bottom 13, the bottom being supported on a cylindrical extension 14. This extension or skirt 14 is usually provided with access openings, not shown, and is of sufficient height to give the desired head room under the bottom 13.

The reactor 10 is divided into a plurality of sections or beds herein designated as A, B, C, and D which are established by the horizontal partitions 15. Generally, there are at least two reaction zones and preferably three or four and they serve to receive and hold the metallic oxides, which may be introduced to the top bed A through inlet 16, during the reduction period.

After a sufficient reduction is completed in the beds, the solids discharge from the bottom bed D through valve 18 and this in turn permits dumping of the next bed C above through downcomer 20 by opening the valve 21.

In turn, the next above bed B can be discharged through the downcomer 23 by opening valve 24 and similarly the topmost bed A may then pass by gravity downwardly by downcomer 25 when valve 26 is open. Thereafter, further fresh feed is introduced to the top bed through the inlet 16.

It is usually found desirable, as set forth in the aforementioned patents, that vertical baffle surfaces should be provided in the respective zones to establish and maintain suitable fluidity obtained by passing the hydrogen up through the ore. Usually these baffles also constitute a heat exchange surface and, as an example, the upper bed A is provided with a series of U-tubes 32 supported from headers 33 and 34 for the passage of heat exchange material therethrough. While this may be a liquid, the hydrogen gas which is to be used as the reducing medium can effectively supply heat by this means. In a similar manner, the lower beds B and C may be provided with similar heat exchangers 35 and 37 each of which is provided with suitable inlet and outlet headers. The lower bed D may be provided with dummy tubes or equivalent surface 39.

For the purpose of this invention, the hydrogen reducing gas is shown as entering the bottom plenum chamber 40 through inlet 41. An alternative construction is shown in Stotler, No. 2,805,144. The effluent gas ultimately discharges out of cyclone separator 42 to discharge line 43 and to suitable recovery apparatus, not shown, in which the water vapor is removed and the recovered hydrogen recycled to the bottom inlet 41 of reactor 10.

We provide a hydrogen fresh feed to the reactor through line 45 and by lines 47 and 49 at points below distributor plates 15 supporting beds B and C. Suitable valving 50 will permit the desired control of the flow of the supplemental hydrogen to these beds. If only two beds were required, the fresh feed would still be to the bed above the bottom bed.

Preferred operating conditions are as follows:

The reduction of magnetite, all of which passes through a 20 mesh screen and at least 25% of which passes a 325 mesh screen is supplied to bed A through valved inlet 16 and the reduction with hydrogen is effected by maintaining a temperature of approximately 950° F. The lower beds B, C, and D may be at a somewhat lower temhowever, may range between 850° F. and 1050° F. depending upon the ores being reduced.

The reduction of magnetite by hydrogen, being endothermic, the desired reaction temperatures are conveniently maintained by preheating the hydrogen and by heat exchange controlled by the heat exchange tubes 32, 35, and 37.

Usually, the hydrogen velocity through the respective beds is about one foot per second (superficial) which maintains the solids in a uniform and quiescent fluidized condition. The extended surface within the beds keeps the solids free of bumping, surging and the like irregularities of fluidization otherwise encountered in large commercial reactors. The fluidized beds have a density of about one hundred pounds per cubic foot. Pressures are maintained in the order of 350 to 550 p.s.i.g. and usually about 400 p.s.i.g.

The recycle hydrogen which is introduced into bed D has a moisture content of less than 0.1 mol percent and contains only small percentages of other gases like methane and nitrogen. It contains no CO even though the fresh feed may have as much as 2% to 3% of CO. This results from the methanation reaction $$CO + 3H_2 \rightarrow CH_4 + H_2O$$

in the upper bed. In this bed, however, the tolerable water is much greater than in the lower bed so that at this zone there is no hindrance to reduction.

As in the above mentioned Keith patents, the fresh hydrogen should have a low average molecular weight, usually below 7.5 and preferably below 5.5. For high degrees of iron ore reduction, it is preferably 95% pure. It should have less than 0.2% by volume of water vapor.

While we have shown and described a preferred form of embodiment of our invention we are aware that modifications may be made thereto within the scope and spirit of the disclosure and only such limitations should be imposed as are indicated by the appended claims.

We claim:

1. A multiple step direct reduction process for iron oxide comprising passing preheated iron oxide fines through a series of superposed fluidized beds with an increasing degree of reduction from the upper to the lower bed, passing preheated hydrogen gas through said beds in series counter to the movement of the iron oxide, purifying said hydrogen flowing from the uppermost bed and recycling the purified gas free from carbon monoxide to the lowermost bed, maintaining a temperature between 850° F. and 1050° F. and a pressure of between 350 and 550 p.s.i.g. in said beds whereby the product discharging from the lowermost bed is predominantly metallic iron, except for the gangue content of the ore, and introducing fresh make-up hydrogen containing small percentages of carbon monoxide to an upper bed of iron oxide of less degree of reduction.

2. A direct reduction process as claimed in claim 1 wherein the hydrogen recycle to the lowermost bed is of at least 80% purity containing only minor amounts of methane and nitrogen and substantially free of carbon monoxide, and the water vapor content of the fresh make-up hydrogen has less than 0.2% by volume of water vapor.

3. A method of reducing iron ore which comprises:
    (a) establishing at least two superposed fluidized beds of powdered iron ore;
    (b) passing hydrogen through the beds in series at fluidizing velocities;
    (c) maintaining temperature and pressure conditions to accomplish a reduction of the oxides in each bed;
    (d) withdrawing an effluent gas including unreacted hydrogen and water vapor but substantially free of carbon monoxide from the uppermost bed;
    (e) removing most of the water from the effluent gas and returning the gas to the lowermost bed;
    (f) and adding fresh carbon monoxide containing hydrogen to a bed above the lowermost bed;
    (g) the reduction temperatures in the upper bed being such as to convert at least a portion of the carbon monoxide in the presence of hydrogen to methane and water.

4. In a multiple step direct reduction process for reducing iron oxide wherein iron oxide fines are maintained in a series of superposed fluidized beds by a hydrogen reducing gas passing upwardly therethrough under temperature and pressure to combine with the oxygen in the iron oxide, and wherein a relatively highly reduced iron is removed from the lowermost bed, and wherein an effluent gas substantially free of carbon monoxide but containing substantial amounts of water vapor is removed overhead from the uppermost fluidized bed so that the iron oxide is reduced in each bed, the improvement wherein the effluent gas from the uppermost bed is denuded of most of its water content and is recycled to the lower part of the fluidized bed containing the highly reduced iron, and a make-up stream of fresh feed hydrogen containing significant amounts of carbon monoxide is introduced to a fluidized bed of less completely reduced iron oxide so that the water produced by the reaction of hydrogen and carbon monoxide is of less criticality than if the said fresh feed hydrogen was introduced to the bed of more completely reduced iron.

References Cited in the file of this patent

UNITED STATES PATENTS

| 2,477,454 | Heath | July 26, 1949 |
| 2,784,960 | Lee | Mar. 12, 1957 |
| 2,890,106 | Heath | June 9, 1959 |
| 2,931,720 | Vaney | Apr. 5, 1960 |

OTHER REFERENCES

Beckman, Morrell, and Egloff: Catalysis, Reinhold Publishing Corp., New York, New York, page 1042, 1940.